May 12, 1936. J. R. GAMMETER 2,040,550
APPARATUS FOR MAKING CONTINUOUS STRIP MATERIAL
Filed May 7, 1934
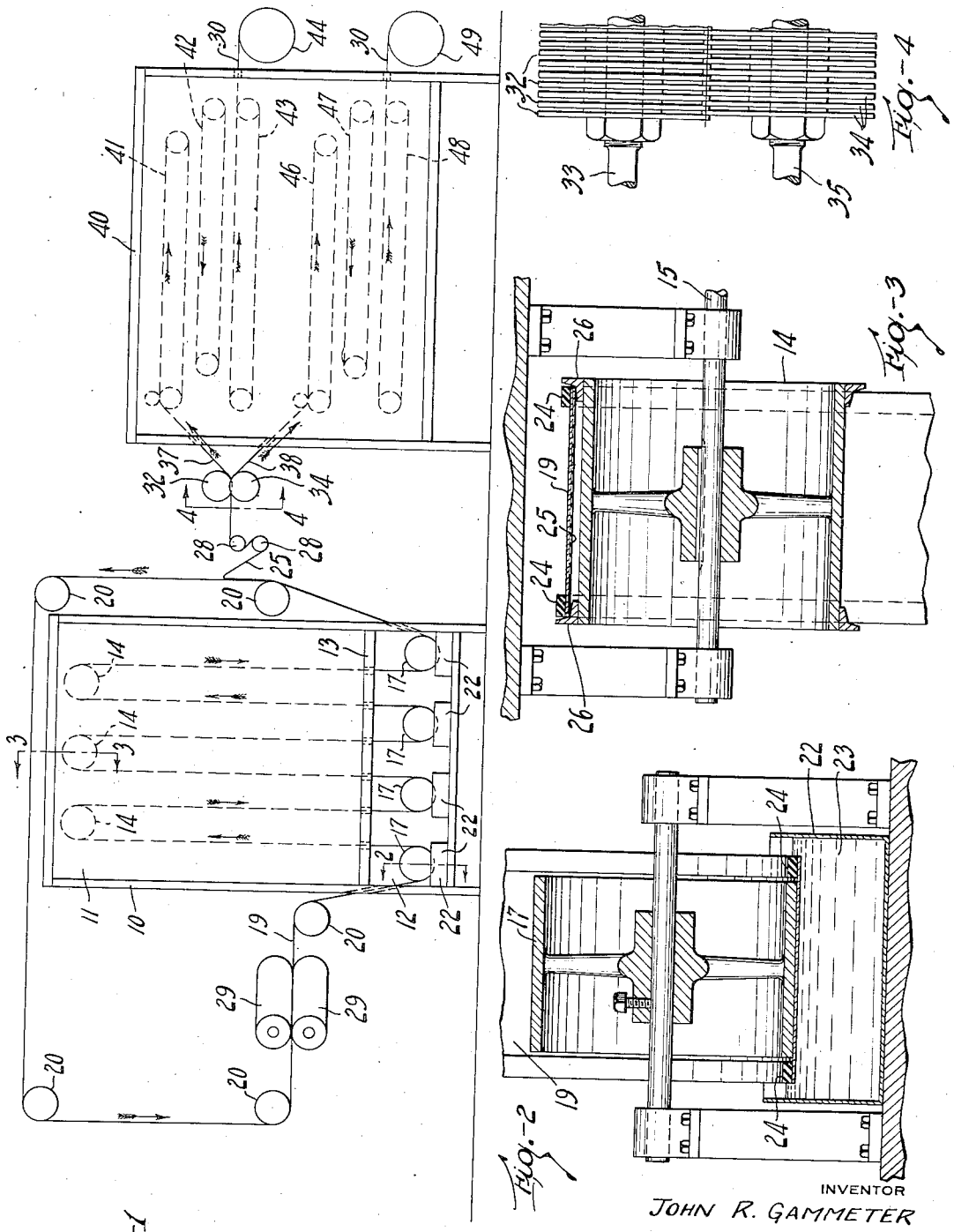
INVENTOR
JOHN R. GAMMETER
BY
Ely & Barrow
ATTORNEYS Patented May 12, 1936

2,040,550

UNITED STATES PATENT OFFICE 2,040,550

APPARATUS FOR MAKING CONTINUOUS STRIP MATERIAL

John R. Gammeter, Akron, Ohio, assignor to United States Rubber Company, New York, N. Y., a corporation of New Jersey Application May 7, 1934, Serial No. 724,339

7 Claims. (Cl. 18—15)

This invention relates to apparatus for making continuous strip material.

It is of especial utility in the manufacture of sheet material from compositions comprising solids dissolved in volatile solvents, or solids dispersed or suspended in volatile or non-volatile fluids. For example, the invention may be used in the manufacture of sheet material from cellulose derivatives, such as cellophane, celluloid, etc., or from rubber cements, wherein the solid material is dissolved in volatile solvents, or it may be used in the manufacture of rubber strip material from natural or artificial aqueous dispersions of rubber, such as rubber latex.

The chief object of the invention is to provide an improved apparatus for making strip material of the character mentioned. More specifically the invention aims to provide improved procedure and apparatus whereby a continuous, relatively wide strip of material may be severed into a plurality of narrower strips. A further object is to provide an endless support upon which the viscous fluid material may be deposited, which support may be passed into a body of said material to coat one side thereof without exposing the other side of said endless support to said fluid body. Other objects will be manifest as the specification proceeds.

Of the accompanying drawing,

Figure 1 is a somewhat diagrammatic side elevation of apparatus embodying and adapted to carry out the invention, in its preferred form;

Figure 2 is a section, on a larger scale, on the line 2—2 of Figure 1;

Figure 3 is a section, on a larger scale, on the line 3—3 of Figure 1; and

Figure 4 is a detail elevation, on a larger scale, on the line 4—4 of Figure 1.

Referring to the drawing, 10 is a housing comprising an upper chamber 11 constituting the major portion of the interior thereof, and a lower chamber 12, there being a partition 13 separating said chambers. The upper chamber 11 is warmed or heated in any usual or preferred manner, and the lower chamber 12 may be kept at room temperature. Mounted in the upper part of chamber 11 is a horizontal series of pulleys 14, 14, which pulleys are mounted upon respective drive shafts 15 that are driven at uniform speed by a suitable source of power (not shown). Although but three pulleys 14 are shown, it will be understood that a greater or lesser number may be employed if desired. Suitably mounted within the lower chamber 12 is a horizontal series of idler pulleys or sheaves 17, 17 of which there are four shown. Trained about pulleys 14, 17 is an endless belt or conveyor 19 that passes over pulleys 14 and under pulleys 17, and passes through suitable slots formed in partition 13. The belt 19 enters the housing 10 through a suitable slot in one side thereof, opening into chamber 12, and leaves the housing at the opposite side thereof through a second slot opening into chamber 12. Exteriorly of the housing 10 is a series of idler pulleys 20, 20 that support the belt 19 as it moves, in the direction indicated by the arrows in Figure 1, from one side of the housing back to point of starting on the other side thereof.

In the bottom of chamber 12, beneath each pulley 17, are respective tanks 22, each of which contains a quantity of fluent viscous material 23, from which the strip material is to be made. Means (not shown) is provided for maintaining the liquid in said tanks at a constant uniform level, which level is higher than the lowest point on the periphery of pulleys 17.

The belt 19 is made of stainless steel or other suitable flexible metal and is somewhat wider than pulleys 17 and somewhat narrower than pulleys 14. Pulleys 20 are of different widths according to whether the belt 19 passes over or under them. On one face of the belt 19, flush with the margins thereof, are respective dams or ribs 24, 24 of rubber or other flexible material that are vulcanized or otherwise affixed to the belt. Said dams or ribs are on the concave or inner face of the belt as it passes around pulleys 17 and on the convex or outer face thereof as it passes over pulleys 14. The dams may be approximately one inch wide and ¼ inch thick, and are disposed laterally of pulleys 17 when passing around the latter, as is most clearly shown in Figure 2. The arrangement is such that the belt 19 in passing about pulleys 17 is carried below the level of the liquid bodies 23 whereby its outer surface and part of the outer marginal surface of ribs 24 are coated with the liquid, said ribs preventing the liquid from reaching the other surface of the belt or the perimeters of the pulleys.

By the method and apparatus described a succession of superposed coatings or deposits 25 are applied to the belt. In passing through the heated upper chamber 11 between successive coatings, the latter are congealed or rendered less viscous by the volatilization of solvent, if the material 23 is a dissolved solid, or by the drying of moisture if the material 23 is an aqueous dispersion. Preferably the pulleys 14 are provided, at their respective lateral margins, with circumferential angular ribs 26, 26 which constitute flanges for maintaining the belt 19 centrally of the pulleys, and which engage the concave, coated, under surface of the belt at its lateral margins only so as to support said belt in spaced relation to the pulleys so that the coating 25 on the belt is not marred or mutilated.

Exteriorly of the housing 10, at the side thereof where the coated belt 19 emerges therefrom, the partly dried coating 25 is removed from the belt, and to this end a pair of driven stripper rollers, shown diagrammatically at 28, 28 are provided, the coating 25 in sheet or strip form passing around each of said rollers, in frictional engagement therewith, so as progressively to be peeled or stripped from the belt. At another region of the belt, exteriorly of the housing and nearer the point where the belt enters the latter, is a cleaning and polishing device comprising a pair of suitably driven revolving brushes 29, 29 between which the belt passes, and which thoroughly clean and polish the belt surfaces so that the coating 25 subsequently will be deposited evenly thereon.

The coating strip 25 is progressively and continuously slit or cut into a plurality of relatively narrow strips or threads 30, 30 after it is removed from the belt 19, and for this purpose a slitting device is positioned adjacent stripper rollers 28 to receive strip 25 as it issues therefrom. As is most clearly shown in Figure 4, said slitting device comprises a group of axially aligned disc knives 32, 32 mounted upon a suitably driven shaft 33, said knives having flat peripheral faces and being spaced apart from each other a distance equal to one knife. A second group of similarly shaped and arranged disc knives 34, 34 is mounted upon an axial shaft 35 that is parallel to shaft 33 and driven in the opposite direction thereto. Shafts 33, 35 are positioned sufficiently near each other to cause intercalation of the adjacent regions of the groups, whereby the strip of material 25 in passing between the two groups of knives is slit into narrow strips or threads, and the latter are easily divided into two groups 37, 38, respectively, each comprising the alternate threads cut from the strip 25, the respective threads of each group being spaced from each other.

The strip 25 is slit as described preferably while still in somewhat moist condition, (containing from 10% to 20% moisture), and if the strip is a composition of rubber, the latter is in unvulcanized condition. For completely drying the work, or for vulcanizing the rubber if it is composed of rubber, a suitably heated oven 40 is provided, the groups of strands 37, 38 entering the oven through respective slots in the wall thereof. Interiorly of the oven are two vertically arranged series of horizontal conveyor belts, the upper series receiving group 37 of the work and the lower series receiving group 38 of the work. The upper series of conveyor belts is shown as consisting of endless belts 41, 42, and 43, respectively, which belts are mounted upon suitable end rollers and driven at uniform speed by any suitable means (not shown). As indicated by the arrows in Figure 1, conveyor belts 41 and 43 are driven in the same direction and belt 42 is driven in the opposite direction. Also conveyor belt 42 is somewhat offset from belts 41, 43, the arrangement being such that the group of threads 37 may be fed along one conveyor, and delivered at the delivery end thereof onto the next lower conveyor until all in that series of conveyors have been traversed. The oven 40 is provided with a delivery slot adjacent the delivery end of the lowermost conveyor 43 through which the thread group 37 may be drawn, and a suitable wind-up roll 44 is positioned exteriorly of the said oven for winding up the finished work as it emerges from the oven.

The lower series of conveyors shown comprises conveyor belts 46, 47, and 48, which belts are arranged in the same manner and driven at the same speed as belts 41 to 43, and serve the same purpose as the latter with respect to thread group 38. A driven wind-up roll 49 is positioned exteriorly of oven 40 for winding up the finished threads in group 38 as they emerge from the oven through a suitable slot therein.

Although each of the conveyor groups is shown and described as consisting of but three conveyors, it will be understood that any suitable number of conveyor belts may be provided according to the time for completely drying and/or vulcanizing the work in the oven.

The invention provides apparatus and procedure for the continuous and economical manufacture of continuous strip material in finished form, and achieves the other objects set out in the foregoing statement of objects.

Modification may be resorted to without departing from the spirit of the invention or the scope of the appended claims.

What is claimed is:

1. Apparatus for making continuous strip material, said apparatus comprising a flexible conveyor belt having local, relatively thick regions at the lateral margins thereof.

2. In apparatus for making continuous strip material, the combination of a flexible conveyor belt, and strips of elastic material attached to one face thereof at its lateral margins.

3. In apparatus for making continuous strip material, the combination of a conveyor belt of flexible material, and strips of rubber coextensive therewith bonded thereto at its lateral margins.

4. In apparatus for making continuous strip material, the combination of a conveyor belt of flexible material having locally thickened regions on one face thereof at its lateral margins, a body of viscous material, and means for feeding the belt longitudinally through the said body at a depth sufficient to coat one face thereof with the viscous material, but not sufficient to completely submerge the thickened marginal regions of the belt.

5. In apparatus for making continuous strip material, the combination of an endless, flexible, conveyor belt having locally thickened regions on one face thereof at its lateral margins, a body of viscous material, a pulley having one region of its perimeter positioned in said viscous body below the level thereof, and means for passing the conveyor belt about said pulley with the thickened regions of the belt on the concave side thereof whereby the convex surface of the belt is coated with the material, the lateral thickened regions preventing the material from reaching the concave side of the belt and the pulley.

6. In apparatus for making continuous strip material, the combination of a pulley, an endless, driven belt passing thereabout, said belt projecting laterally of the pulley, strips of elastic material secured to that face of the belt that is concave when passing around said pulley, on the marginal regions that project laterally of the pulley, and a body of viscous material below the pulley in contact with the convex side of the belt and adjacent sides of said marginal strips, but not extending above the latter.

7. In apparatus for making continuous strip material, the combination of a housing, a series of pulleys near the top thereof, a series of pulleys at the bottom thereof, an endless flexible belt extending into and out of said housing and trained in reverse curves over the pulleys of the upper series and under the pulleys of the lower series, bodies of viscous material disposed below the respective lower pulleys so as to coat one face of the belt as it passes under said pulleys, and means on the respective upper pulleys engaging the respective marginal portions of the belt, as it passes thereover, for supporting the coated face of the belt in spaced relation to the peripheral face of the pulley.

JOHN R. GAMMETER.